United States Patent [19]

Allen

[11] Patent Number: 4,904,702

[45] Date of Patent: Feb. 27, 1990

[54] FOAMABLE ENGINEERING THERMOPLASTIC COMPOSITIONS

[75] Inventor: Richard B. Allen, Pittsfield, Mass.

[73] Assignee: General Electric Company, Pittsfield, Mass.

[21] Appl. No.: 317,010

[22] Filed: Feb. 28, 1989

Related U.S. Application Data

[63] Continuation of Ser. No. 947,687, Dec. 30, 1986, abandoned.

[51] Int. Cl.$^4$ ................................................ C08J 9/10
[52] U.S. Cl. ......................................... 521/88; 521/79; 521/81; 521/95; 521/97; 521/98; 521/139; 521/180; 521/182
[58] Field of Search .................. 521/79, 81, 95, 97, 521/98, 139, 180, 182

[56] References Cited

U.S. PATENT DOCUMENTS

| | | | |
|---|---|---|---|
| 2,904,522 | 9/1959 | Catlin | 521/73 |
| 2,917,472 | 12/1959 | Smith | 521/73 |
| 3,055,846 | 9/1962 | Flack et al. | 521/73 |
| 3,067,151 | 12/1963 | Terry et al. | 521/73 |
| 3,305,496 | 2/1967 | Riley, Jr. et al. | 521/909 |
| 3,321,413 | 5/1967 | Riley, Jr. et al. | 521/909 |
| 3,340,209 | 9/1967 | Riley, Jr. et al. | 521/909 |
| 4,288,560 | 9/1981 | Kirchmayr et al. | 521/180 |
| 4,544,677 | 10/1985 | Allen et al. | 521/91 |
| 4,607,059 | 8/1986 | Kmiec et al. | 521/180 |

FOREIGN PATENT DOCUMENTS 3220856 12/1982 Fed. Rep. of Germany.

OTHER PUBLICATIONS

Mukai et al., Chemical Abstracts, 80:28011e.
Audo et al., Chemical Abstracts, 86:13813c.

*Primary Examiner*—Morton Foelak
*Attorney, Agent, or Firm*—Hedman, Gibson, Costigan & Hoare

[57] ABSTRACT

A foamable composition comprises in admixture (a) a high molecular weight thermoplastic resin in particulate form and an effective amount of (b) a foaming agent therefor comprising a pumpable liquid dispersion comprising (i) a solid blowing agent, (ii) a liquid carrier, and, optionally, (iii) a thickener. The liquid dispersion can be pumped directly into the hopper of a foam molding machine eliminating the need to pre-mix pelletized concentrates of the solid blowing agent.

10 Claims, No Drawings

FOAMABLE ENGINEERING THERMOPLASTIC COMPOSITIONS

This is a continuation of application Ser. No. 947,687, filed Dec. 30, 1986, now abandoned.

This invention relates to foamable compositions comprising (a) a high molecular weight thermoplastic resin in particulate form; and (b) an effective amount of a foaming agent therefor comprising a liquid dispersion comprising (i) a solid blowing agent; (ii) a liquid carrier; and, optionally, (iii) fumed colloidal silica. The liquid dispersion of the blowing agent can be usefully pumped directly into the hopper of a foam molding machine, thus obviating the necessity for conventional premixing of pelletized concentrates. Furthermore, the concentration of the blowing agent can be readily changed by varying the pumping rate of the blowing agent delivery system.

BACKGROUND OF THE INVENTION

Foamable compositions comprising high molecular weight engineering thermoplastic resins, such as polycarbonates, polyphenylene ethers, polyesters, and the like, are known, and these can include solid foaming agents and thickeners, such as fumed silica. See, for example, R. B. Allen et al., U.S. Pat. No. 4,544,677.

Japanese Patent Application 47/51821 (1972), reported in Chemical Abstracts 80(6):28011e, discloses expandable polycarbonate compositions including uniformly distributed solid blowing agent, e.g., barium azidocarboxylate. Wetting agents, such as liquid paraffin, are employed to prevent the separation of the solid blowing agent from the resin particles and to stabilize the mixture. Liquid dispersions of solid blowing agents are not disclosed.

Japanese Patent Application 51/138756 (1976), discloses the solid blowing agent, 5-phenyltetrazole, a nylon, and a glass fiber-reinforced polycarbonate and teaches the use of a wetting agent, such as polyethylene glycol or mineral oil, to improve the compatibility of the foamable blend. There is no suggestion, however, to form a liquid dispersion of the blowing agent in the wetting agent.

Now it has been unexpectedly discovered that if liquid dispersion is prepared by mixing a solid, particulate blowing agent, such as 5-phenyl-3,6-dihydro (1,3,4) oxadizin-2-one, with a liquid carrier, such as mineral oil, and an optional thickener, such as fumed colloidal silica, such a liquid dispersion foaming agent can be blended with engineering thermoplastics, such as polycarbonate resins to provide foamable compositions without the need to premix pelletized concentrates, as is done conventionally at the present time. Moreover, there is no problem with lack of compatibility as has been previously experienced. The liquid dispersion can be pumped directly into the hopper of a foam molding machine and the concentration of the solid blowing agent component can readily be changed by changing the pumping rate of the blowing agent delivery system.

SUMMARY OF THE INVENTION

In accordance with the present are provided compositions adapted for foam molding comprising (a) a high molecular weight thermoplastic resin in particulate form; and (b) an effective amount of a foaming agent therefor comprising a pumpable liquid dispersion comprising (i) a solid blowing agent;
(ii) a liquid carrier; and, optionally,
(iii) a thickener.

In preferred features of the invention, foaming agent component (b) comprises from about 0.02 to about 5 parts by weight based on 100 parts by weight of components (a) and (b). Furthermore, in component (b), (i) comprises from about 10 to about 90 parts by weight; component (ii) comprises from about 90 parts to about 10 parts by weight, and, optionally, component (iii) comprises from about 0.1 parts to about 5 parts by weight, based upon the total weight of components (b)(i), (b)(ii) and, optionally, (b)(iii).

The compositions of the present invention may also include, in addition to (a) and (b), pigments, such as carbon black, impact modifiers, flow promoters and the like, as well as flame retardant agents.

DETAILED DESCRIPTION OF THE INVENTION

The term "engineering thermoplastics" includes resins with superior properties, especially mechanical strength and toughness, and typically embraces aromatic polycarbonates, polyphenylene ethers, alone, or combined with styrene resins, polyalkylene arylates, wholly aromatic polyesters, nylons, polysulfones, polyarylene ethers, mixtures of any of the foregoing, and the like.

Polycarbonate homopolymers useful in this invention are especially aromatic polycarbonates. These can be made by those skilled in the art or obtained from various commercial sources. They may be prepared by reacting dihydric phenol with a carbonate precursor, such as phosgene, a haloformate or a carbonate ester. Typically, they will have recurring structural units of the formula:

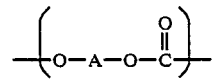

wherein A is a divalent aromatic radical of the dihydric phenol employed in the polymer producing reaction. Preferably, the aromatic carbonate polymers have an intrinsic viscosity ranging from 0.30 to 1.0 dl./g. (measured in methylene chloride at 25° C.). By dihydric phenols is meant mononuclear or polynuclear aromatic compounds containing two hydroxy radicals, each of which is attached to a carbon atom of an aromatic nucleus. Typical dihydric phenols include 2,2-bis-(4-hydroxy-phenyl)propane; 2,2-bis-(3,5-dimethyl-4-hydroxyphenyl)propane, 4,4'-dihydroxydiphenyl ether, bis(2-hydroxyphenyl)methane, mixtures thereof and the like. The preferred aromatic carbonate polymer is a homopolymer derived from 2,2bis-(4-hydroxyphenyl)-propane(bisphenol-A).

Polyphenylene ethers useful in this invention can be made by those skilled in this art, see, for example, U.S. Pat. No. 3,306,864 and U.S. Pat. No. 3,306,865, and they also are available commercially. They may be prepared by the oxidative coupling of a phenol or a substituted phenol having a hydrogen substituent para to the phenolic hydroxyl using a complex salt such as a copper halide-amine as a catalyst. Typically, they will have recurring structural units of the formula

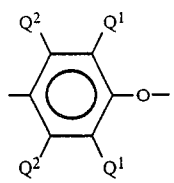

wherein each $Q^1$ is hydrogen, halogen, primary or secondary lower alkyl, phenyl, haloalkyl, aminoalkyl, etc., and each $Q^2$ is hydrogen, halogen, primary or secondary lower alkyl, phenyl, haloalkyl, hydrocarbonoxy, halohydrocarbonoxy, or the like. Both homopolymers and copolymers are included. Generally, the molecular weight is in the range of 5,000 to 40,000 (by GPC) and the intrinsic viscosity will usually be in the range of 0.4 to 0.6 dl./g. as measured in chloroform at 25° C. The most preferred polyphenylene ether is poly(2,6-dimethyl-1,4-phenylene ether).

As is described in Azik, U.S. 3,383,435, the Polyphenylene ethers can be used in combination with a styrene resin, such as polystyrene, poly alpha-methyl styrene, poly(vinyl toluene) and the like, including high impact rubber modified polystyrenes. The ratios can vary widely, e.g., from 99 to 1, preferably from 80 to 20 parts by weight of the polyphenylene ether to correspondingly from 1 to 99, preferably from 20 to 80 parts of the styrene resin. Especially preferred are compositions comprising poly(2,6-dimethyl-1,4-phenylene ether) and a styrene grafted polybutadiene-based high impact polystyrene.

High molecular weight polyesters useful in this invention can be made by those skilled in this art and they are also available commercially. These will typically comprise linear saturated condensation products of diols and dicarboxylic acids or reactive derivatives thereof. Preferably, they will comprise condensation products of aromatic dicarboxylic acids and aliphatic diols. It is understood that it is also possible to use polyesters such as. poly(1,4-dimethylol cyclohexane dicarboxylates, e.g., terephthalates), and poly(butylene glycol terephthalates). In addition to phthalates, small amounts of other aromatic dicarboxylic acids, such as naphthalene dicarboxylic acid or aliphatic dicarboxylic acids, such s adipic acid, can also be present in preferred compositions. The diol constituent can also be varied, in the preferred embodiments, by adding cycloaliphatic diols. In any event, the preferred polyesters are well known as film and fiber formers, and they are provided by methods outlined in Whinfield, U.S. 2,465,319; Pengilly, U.S. 3,047,539, and elsewhere. The most preferred polyesters will comprise a poly(alkylene terephthalate, or mixed iso-terephthalate, e.g., up to 30 mole percent isophthalate), the alkylene groups containing from 2 to 10 carbon atoms, e.g., poly(ethylene terephthalate) or poly(1,4-butylene terepthalate). Special mention is made of the latter because of its rapid chrystallizations from the melt.

The molecular weight of the polyester component should be sufficiently high to provide an intrinsic viscosity of about 0.6 to 2.0 dl./g., preferably 0.7 to 1.6 dl./g., measured for example as a 1 percent solution in a 60:40 mixture of phenol and tetrachloroethane at 25° C.

As has been mentioned, the engineering thermoplastics can also be used in admixtures within compatibility parameters known in this art. Special mention is made in this connection of combinations comprising aromatic polycarbonates of high molecular weight.

The relative amount of the polymer (a) can and usually does vary widely in the blend, with particular amounts depending on specific requirements and the nature of the polymer being employed. Proportions can range, for example, between 99:1 and 1:99, based on 100 parts by weight of the polymers. Best amounts in a given instance will be readily determinable by those skilled in the art.

For those embodiments of the invention having flame retardant properties, conventional additives can be used in conventional amounts. For example, with polycarbonates, sulfonate salts in small amounts can be used, such as a sulfonate salt, e.g., potassium benzenesulfonic acid at least 0.1, and preferably 0.4 parts per hundred by weight of polycarbonate and the other resins, aromatic halogen compounds, such as tetrabromobisphenol-A homopolymers or copolymers or oligomers or decabromodiphenyl ether, etc., alone, or with a suitable synergist, such as antimony oxide, can be used in effective amounts to provide flame resistance, e.g., about 2-12 parts by weight of bromine per 100 parts by weight of flammable resin content.

The foaming agents (b) of the present invention comprises a liquid dispersion further comprising
 (i) a solid blowing agent;
 (ii) a liquid carrier; and, optionally,
 (iii) fumed colloidal silica.

The solid blowing agent (b)(i) can be selected from chemicals containing decomposable groups such as azo, N-nitrous, carboxylate, carbonate, heterocyclic nitrogen containing and sulfonyl hydrazide groups. Generally, the blowing agents are solid materials that liberate gas(es) when heated by means of a chemical reaction or decomposition. Representative compounds include azodicarbonamide, dinitrosopentamethylene tetramethylene tetramine, p,p'oxy-bis(benzene-sulfonyl)-hydrazide, benzene-1,3-disulfonyl hydrazide, azo-bis-(isobutyronitrile), biuret and urea. The dihydrooxadiazinones of U.S. Pat. No. 4,097,425 are members of an especially preferred family of foaming agents.

The temperature and pressures to which the foamable composition of the invention are subjected to provide a foamed polycarbonate composition will vary within a wide range, depending upon the amount and type of foaming agent that is used. The foaming agents may be used in amounts of from about 0.01 to about 2.5 parts by weight and preferably from about 0.02 to 2.0 parts by weight per 100 parts by weight of the total of (a) and (b). The preferred solid blowing agents to be used in the liquid dispersion are dinitrosopentamethylene tetramine, p-toluene sulfonyl semicarbazide, 5-phenyltetrazole, calcium oxalate, trihydrazino-s-triazine, 5-phenyl-3,6-dihydro-1,3,4-oxadiazin-2-one, 3,6-dihydro-5,6-diphenyl-1,3,4-oxadiazin-2-one and mixtures of any of them. Especially preferred is 5-phenyl-3,6-dihydro-1,3,4-oxadiazine-2-one.

The liquid carrier comprises any number of suitable compounds including mineral oil, a polyether glycol, such as polyethylene glycol, an epoxidized vegetable oil, e.g., epoxidized soybean oil, a fatty acid ester, such as polyethylene glycol distearate, mixtures of any of the foregoing, and the like. Especially preferred is mineral oil.

The above-mentioned solid blowing agent, component (b)(i) and the liquid carrier component (b)(ii) may be mixed together in any of the conventional methods known to those skilled in the art.

Alternatively, components (i) and (ii) may be mixed with an optional thickener, component (iii). Any of a number of thickening compounds can be used optionally with components (i) and (ii) to produce the liquid dispersion foaming agent. Suitable among these are fumed colloidal silica, poly(alkylene oxides), acrylic acid polymers and copolymers. Preferred is fumed colloidal silica available as CABOSIL®M5 from Cabot Corporation.

In the present invention, it is preferred to use silica as component (b)(iii). These are readily available in a variety of forms with suitable particle sizes, aspect ratios and surface polarities. Although a wide variety of silicas are used in plastics, for component (b)(iii) herein, only a synthetic type will be used. These differ from silicas of mineral type, which are mainly used in the form of quartz and glass as fillers. Amorphous, i.e., non-crystalline silicas on the other hand, are typically used in generally small amounts, to achieve special effects. They are made by well known processes, such as one of the pyrogenic processes, i.e., the AEROSIL process in which silicon tetrachloride is mixed with hydrogen and oxygen at 1000° C. or higher, or the electric arc process in which quartz and coke are heated at 1500° C. or above and the SiO and CO which are formed thereby are further reacted with atmospheric oxygen.

In some embodiments, the compositions of the present invention can include an effective amount of a modifier to increase the impact strength of the composition. These can comprise organic polymeric materials generally used to enhance the impact strength of thermoplastics. Typically, they can be a block copolymer of butadiene and styrene, a block copolymer of polycarbonate and polysiloxane, linear low density polyolefins and the like. They will be used in conventional amounts, e.g., from 0.5 to 20 parts by weight, preferably from 2 to 10 parts by weight, per 100 parts of total composition.

The composition of this invention can be fed into a conventional molding machine. The molding temperature may be from about 500° F. to about 580° F. with the mold temperature being from about 100° F. to 250° F., preferably from about 140° F. to about 200° F. Temperatures and conditions are taught, for example, in the above-mentioned Niznik, U.S. Pat. No. 4,097,425.

The foamable composition may be handled in any conventional manner employed for the fabrication or manipulation of thermoplastics such as low and high pressure injection molding to provide thermoplastic products which have uniform cell structure, smooth surfaces, high impact, modulus and tensile strength, improved flow and cycle time.

The composition may contain additional materials such as pigments and dyes, stabilizers, antioxidants, mold-release agents, ultraviolet stabilizers, and the like.

DESCRIPTION OF THE PREFERRED EMBODIMENTS

The following examples are set forth herein to illustrate in more detail the preferred embodiments and to illustrate more clearly the principle and practice of this invention to those skilled in the art. Unless otherwise specified, where parts or percents are mentioned, they are parts or percents by weight.

EXAMPLE 1

A composition was prepared comprising an aromatic polycarbonate resin (General Electric Company, LEXAN 100), and a foaming agent of this invention comprising a liquified dispersion of a solid blowing agent, a liquid carrier and optionally, as indicated, a thickener. The liquid blowing agent composition was prepared by mixing 1500 grams of mineral oil from Ashland Chemical with 1500 grams of blowing agent, 5-phenyl-3,6-dihydro-1,3,4-oxadiazine-2-one, and 24 grams of thickening agent, Cabosil M5. This mixture was homogenized in a 1 gallon Waring Blender for 1 minute. The Brookfield viscosity using the Number 6 Spindel at 10 RPM was 94 and 118 centapoise for the first and second half batches respectively. For comparison purposes, a composition having a foaming agent in the form of a concentrate in aromatic polycarbonate instead of the liquid blowing agent, was foam molded and tested. The formulations used and the results obtained are set forth in Table 1.

TABLE 1

| Foamable Compositions of Polycarbonate and Foaming Agent | | |
|---|---|---|
| Example | 1 | 1A* |
| Compositions (parts by weight) | | |
| Poly(bisphenol-A carbonate) | 100 | 100 |
| 5-phenyl-3,6-dihydro-1,3,4-oxadiazin-2-one | — | 0.25** |
| Liquid Blowing Agent, Example 1 | .50 | 00 |
| Properties | | |
| Density (g/cc) | 0.90 | 0.90 |
| HDT (degrees, F) | 230.00 | 237.00 |
| Drop ball impact (ft-lbs) | 43.00 | 41.00 |
| Unnotched Izod Impact Strength-Gate (ft-lb/in) | 12.70 | 10.00 |
| Unnotched Izod Impact Strength-Nongate (ft-lb/in) | 9.60 | 9.60 |
| Flexural modulus (Kpsi) | 236.00 | 300.00 |
| Flexural strength (Kpsi) | 9.00 | 9.60 |
| Tensile Strength at Yield (Kpsi) | 5.90 | 5.60 |
| Tensile Strength at Break (Kpsi) | 5.60 | 5.60 |
| Elongation at Break (%) | 4.00 | 4.00 |
| IV Drop (dl/g) | 0.02 | 0.02 |
| Underwriters Laboratories Vertical Burn Test UL-94 @.250" | VO | VO |
| 5V @.250" | Pass | Pass |
| Paint Adhesion | Pass | Pass |
| Paint Surface | Slight Swirling | Good |

*Comparison
**As 5% concentrate in Poly(bisphenol-A carbamate)

The foregoing results indicate that the composition of this invention had better release than that of the control; it had better flow as measured by injection time; and some processing related slight swirl patterns were noted, but these were not due to the liquid blowing agent.

The foregoing patents applications, and publications are incorporated herein by reference. Many variations will suggest themselves to those skilled in this art in light of the above, detailed description. For example, the polycarbonate can be replaced in part by poly(ethylene terephthalate), poly(1,4-butylene terephthalate) poly(1,4-cyclohexyldimethylene)terephthalate, poly(2,6-dimethyl-1,4-phenylene ether) in combination with an equal weight of rubber modified high impact polystyrene resin, or a combination of 60 parts by weight of poly(bisphenol-A carbonate) and 40 parts by weight of poly(1,4-butylene terephthalate). In all cases structural foams comprising a rigid, substantially void-free, substantially uniform cellular core within a solid integral skin will be obtained. The blowing agent 5-phenyl-3,6-dihydro-1,3,4-oxadiazinedione can be replaced with 5-phenyl tetrazole. All such obvious variations are within the full intended scope of the appended claims.

I claim:

1. A composition adapted for foam molding into an article having a rigid, substantially void-free, substantially uniform cellular core within a solid integral skin, said composition comprising a blend of
   (a) a high molecular weight resin in particulate form; and
   (b) a pumpable liquid dispersion of a foaming agent in an effective amount of from about 0.02 to about 5 parts by weight based on 100 parts of the total of (a) and (b), said dispersion comprising
       (i) a solid blowing agent;
       (ii) at least 10 parts by weight of a liquid carrier based on 100 parts by weight of liquid carrier and solid blowing agent combined; and, optionally,
       (iii) a thickener.

2. A composition as defined in claim 1 wherein component (a) comprises (i) an aromatic polycarbonate, (ii) a polyphenylene ether, alone, or in combination with a styrene resin; a poly(alkylene terephthalate) or a mixture of any of the foregoing.

3. A composition as defined in claim 1 wherein said blowing agent (b) comprises (i) is present in an amount of from about 10 to about 90 parts by weight, (ii) in an amount of from about 90 to about 10 parts by weight, and (iii) if present, in an amount of from about 0.1 to about 5 parts by weight based on the 100 parts by weight of the total composition.

4. A composition as defined in claim 1 wherein component (a) comprises an aromatic polycarbonate.

5. A composition as defined in claim 4 wherein component (a) comprises poly(bisphenol A carbonate).

6. A composition as defined in claim 1 wherein component (b)(i) is selected from nitrosos, semi-carbazides, tetrazoles, oxalates, triazines, dihydrooxadiazinones, or a mixture of any of the foregoing.

7. A composition as defined in claim 6 wherein component (b)(i) comprises 5-phenyl-3,6-dihydro-1,3,4-oxadiazin-2-one.

8. A composition as defined in claim 1 wherein liquid component (b)(ii) comprises mineral oil, a diester, a polyether glycol, an epoxidized vegetable oil, a fatty acid ester or a mixture of any of the foregoing.

9. A composition as defined in claim 8 wherein liquid component (b)(ii) comprises mineral oil.

10. A composition as defined in claim 1 wherein said component (b)(iii) comprises fumed colloidal silica.

* * * * *